US012620649B2

(12) United States Patent
Han et al.

(10) Patent No.: US 12,620,649 B2
(45) Date of Patent: May 5, 2026

(54) BATTERY MODULE AND MANUFACTURING METHOD OF THE SAME

(71) Applicant: LG ENERGY SOLUTION, LTD., Seoul (KR)

(72) Inventors: Honggoo Han, Daejeon (KR); Junyeob Seong, Daejeon (KR); Won Kyoung Park, Daejeon (KR); Subin Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 698 days.

(21) Appl. No.: 18/024,025

(22) PCT Filed: Jan. 6, 2022

(86) PCT No.: PCT/KR2022/000249
§ 371 (c)(1),
(2) Date: Feb. 28, 2023

(87) PCT Pub. No.: WO2022/149885
PCT Pub. Date: Jul. 14, 2022

(65) Prior Publication Data
US 2023/0268584 A1 Aug. 24, 2023

(30) Foreign Application Priority Data

Jan. 11, 2021 (KR) ........................ 10-2021-0003179

(51) Int. Cl.
*H01M 10/6551* (2014.01)
*H01M 10/613* (2014.01)
(Continued)

(52) U.S. Cl.
CPC ..... *H01M 10/6551* (2015.04); *H01M 10/613* (2015.04); *H01M 10/625* (2015.04);
(Continued)

(58) Field of Classification Search
CPC .......... H01M 10/6551; H01M 10/613; H01M 10/625; H01M 10/647; H01M 10/653;
(Continued)

(56) References Cited

U.S. PATENT DOCUMENTS 6,300,003 B1 * 10/2001 Misra .................. H01M 50/291
429/100
9,419,256 B2 * 8/2016 Tonomura ........... H01M 10/613
(Continued)

FOREIGN PATENT DOCUMENTS

CN 102881855 A * 1/2013 ......... H01M 50/507
CN 110867543 A * 3/2020 ......... H01M 10/613
(Continued)

*Primary Examiner* — Kaity V Chandler
(74) *Attorney, Agent, or Firm* — Bryan Cave Leighton Paisner LLP

(57) ABSTRACT

A battery module includes a battery cell stack. The battery cell stack includes a plurality of battery cells and a cooling fin between the plurality of battery cells. The cooling fin includes a first portion facing a first one of the plurality of battery cells and a second portion facing a second one of the plurality of battery cells. A space is formed between the first portion and the second portion.

11 Claims, 11 Drawing Sheets

(a)

(b)

(51) Int. Cl.

| | |
|---|---|
| *H01M 10/625* | (2014.01) |
| *H01M 10/647* | (2014.01) |
| *H01M 10/653* | (2014.01) |
| *H01M 50/211* | (2021.01) |

(52) U.S. Cl.
CPC ....... *H01M 10/647* (2015.04); *H01M 10/653* (2015.04); *H01M 50/211* (2021.01); *H01M 2220/20* (2013.01)

(58) Field of Classification Search
CPC ........... H01M 50/211; H01M 2220/20; H01M 10/6554; H01M 10/6555; H01M 10/6556; H01M 10/6563; H01M 10/6566; H01M 50/209; H01M 50/224; Y02E 60/10
See application file for complete search history.

(56) References Cited

U.S. PATENT DOCUMENTS

| | | | |
|---|---|---|---|
| 2001/0007728 A1 | 7/2001 | Ogata et al. | |
| 2006/0204840 A1 | 9/2006 | Jeon et al. | |
| 2011/0052963 A1 | 3/2011 | Lee et al. | |
| 2012/0107664 A1 | 5/2012 | Lee et al. | |
| 2012/0301771 A1 | 11/2012 | Moser et al. | |
| 2013/0071718 A1 | 3/2013 | Cho et al. | |
| 2014/0120400 A1 | 5/2014 | Yoshioka et al. | |
| 2018/0114957 A1* | 4/2018 | Kim ................. | H01M 10/6555 |
| 2018/0269548 A1* | 9/2018 | Chi ......................... | B60L 50/64 |
| 2019/0006642 A1 | 1/2019 | Sakaguchi et al. | |
| 2019/0198950 A1 | 6/2019 | Kuboki et al. | |
| 2020/0035975 A1 | 1/2020 | Cho et al. | |
| 2022/0173453 A1 | 6/2022 | Jo | |

FOREIGN PATENT DOCUMENTS

| | | | | |
|---|---|---|---|---|
| CN | 111864172 A | * | 10/2020 | ............. H01M 4/70 |
| CN | 112103419 A | * | 12/2020 | ........ H01M 10/6557 |
| CN | 112103420 A | * | 12/2020 | .......... H01M 50/209 |
| DE | 102012101141 A1 | | 8/2013 | |
| JP | 2001-196103 A | | 7/2001 | |
| JP | 2006253149 A | | 9/2006 | |
| JP | 2013-510385 A | | 3/2013 | |
| JP | 2013-242979 A | | 12/2013 | |
| JP | WO2012-173269 A1 | | 2/2015 | |
| JP | 5871067 B2 | | 3/2016 | |
| JP | WO2017-159527 A1 | | 1/2019 | |
| JP | 2020-145116 A | | 9/2020 | |
| KR | 10-2011-0011068 A | | 2/2011 | |
| KR | 10-2011-0021181 A | | 3/2011 | |
| KR | 10-1272524 B1 | | 6/2013 | |
| KR | 10-2014-0091622 A | | 7/2014 | |
| KR | 10-1807494 B1 | | 12/2017 | |
| KR | 10-2019-0074796 A | | 6/2019 | |
| KR | 10-2020-0011816 A | | 2/2020 | |
| KR | 10-2020-0129991 A | | 11/2020 | |
| WO | WO-2011054952 A1 | * | 5/2011 | .......... H01M 50/103 |
| WO | WO-2012057169 A1 | * | 5/2012 | .......... H01M 50/289 |
| WO | 2014-010395 A1 | | 1/2014 | |
| WO | WO 2020-231071 A1 | | 11/2020 | |

* cited by examiner (a)  (b)

(a)

(b)

(a)

(b)

(a)

(b)

BATTERY MODULE AND MANUFACTURING METHOD OF THE SAME

CROSS CITATION WITH RELATED APPLICATION(S)

This application is a National Phase entry pursuant to 35 U.S.C. 371 of International Application PCT/KR2022/000249 filed on Jan. 6, 2022, which claims priority to and the benefit of Korean Patent Application No. 10-2021-0003179 filed on Jan. 11, 2021 with the Korean Intellectual Property Office, the content of which is incorporated herein by reference in its entirety.

TECHNICAL FIELD

The present disclosure relates to a battery module and a method for manufacturing the same, and more particularly, to a battery module having improved safety against fire and cooling performance and a method for manufacturing the same.

BACKGROUND

In modern society, as portable devices such as a mobile phone, a notebook computer, a camcorder and a digital camera has been daily used, the development of technologies in the fields related to mobile devices as described above has been activated. In addition, chargeable/dischargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel. Therefore, the demand for development of the secondary battery is growing.

Currently, commercialized secondary batteries include a nickel cadmium battery, a nickel hydrogen battery, a nickel zinc battery, and a lithium secondary battery. Among them, the lithium secondary battery has come into the spotlight because they have advantages, for example, hardly exhibiting memory effects compared to nickel-based secondary batteries and thus being freely charged and discharged, and having very low self-discharge rate and high energy density.

Such lithium secondary battery mainly uses a lithium-based oxide and a carbonaceous material as a cathode active material and an anode active material, respectively. The lithium secondary battery includes an electrode assembly in which a cathode plate and an anode plate, each being coated with the cathode active material and the anode active material, are arranged with a separator being interposed between them, and a battery case which seals and houses the electrode assembly together with an electrolyte solution.

Generally, the lithium secondary battery may be classified based on the shape of the exterior material into a can type secondary battery in which the electrode assembly is mounted in a metal can, and a pouch-type secondary battery in which the electrode assembly is mounted in a pouch of an aluminum laminate sheet.

In the case of a secondary battery used for small-sized devices, two to three battery cells are arranged, but in the case of a secondary battery used for a middle or large-sized device such as an automobile, a battery module in which a large number of battery cells are electrically connected is used. In such a battery module, a large number of battery cells are connected to each other in series or parallel to form a cell assembly, thereby improving capacity and output. In addition, one or more battery modules can be mounted together with various control and protection systems such as a BMS (battery management system) and a cooling system to form a battery pack.

When the temperature of the secondary battery rises higher than an appropriate temperature, the performance of the secondary battery may be deteriorated, and in the worst case, there is also a risk of an explosion or ignition. In particular, a large number of secondary batteries, that is, a battery module or a battery pack having battery cells, can add up the heat generated from the large number of battery cells in a narrow space, so that the temperature can rise more quickly and excessively. In other words, a battery module in which a large number of battery cells are stacked, and a battery pack equipped with such a battery module can obtain high output, but it is not easy to remove heat generated from the battery cells during charging and discharging. When the heat dissipation of the battery cell is not properly performed, deterioration of the battery cells is accelerated, the lifespan is shortened, and the possibility of explosion or ignition increases.

Moreover, in the case of a battery module included in a vehicle battery pack, it is frequently exposed to direct sunlight and may be placed under high-temperature conditions such as summer or desert areas. Further, since a plurality of battery cells are concentratedly arranged to increase the mileage of the vehicle, a fire or heat generated in any one of the battery cells can easily propagate to adjacent battery cells, which may eventually lead to explosion or ignition of the battery pack itself.

Therefore, there is a demand for a battery module having a function of blocking fire transmission along with cooling and heat dissipation performance for the battery cells.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

It is an object of the present disclosure to provide a battery module that can effectively discharge the heat generated from battery cells and at the same time block the propagation of fire or heat generated from any one of the battery cells to the adjacent battery cells, and a method for manufacturing the same.

However, the problem to be solved by the embodiments of the present disclosure is not limited to the above-described problems, and can be variously expanded within the scope of the technical idea included in the present disclosure.

According to one aspect of the present disclosure, there is provided a battery module comprising: a battery cell stack comprising a plurality of battery cells; and a cooling fin between the plurality of battery cells, wherein the cooling fin comprises a first portion facing a first one of the plurality of battery cells and a second portion facing a second one of the plurality of battery cells, and wherein a space is formed between the first portion and the second portion.

A first bead protruding toward the second portion may be formed in the first portion, and a second bead protruding toward the first portion may be formed in the second portion.

The cooling fin may be bent at least once to form the first portion and the second portion.

The cooling fin may further comprise a third portion, and the cooling fin may be bent to form a first bending portion connecting the first portion and the second portion. The cooling fin may be bent to form a second bending portion connecting the second portion and the third portion, and the third portion may be between the first portion and the second portion.

A first bead protruding toward the second portion may be formed in the first portion, a second bead protruding toward the first portion may be formed in the second portion, an opening may be formed adjacent the third portion, and the first bead and the second bead may face each other in the opening.

A side surface flange portion may be located on a side of the first portion or a side of the second portion, and the side surface flange portion may be bent perpendicular to a surface of the first portion or a surface of the second portion.

A rectangular sheet having a first side and a second side may include the first portion and the second portion, and the first bending portion and the second bending portion may be formed on the first side. The first side may be longer than the second side.

The battery module may further comprise a thermal conductive resin layer under the battery cell stack, and the plurality of battery cells and the cooling fin may be in contact with the thermal conductive resin layer.

A method for manufacturing a battery module may include the steps of: forming a cooling fin from a metal plate; and stacking a plurality of battery cells with the cooling fin between adjacent battery cells of the plurality of battery cells to form a battery cell stack, wherein the cooling fin may include a first portion in contact with a first one of the adjacent battery cells and a second portion in contact with a second one of the adjacent battery cells, and wherein a space is formed between the first portion and the second portion.

A first bead protruding toward the second portion may be formed in the first portion, and a second bead protruding toward the first portion may be formed in the second portion.

The cooling fin may further include a third portion between the first portion and the second portion.

The step of manufacturing the cooling fin may include forming a second bending portion connecting the second portion and the third portion, the second portion and the third portion facing each other by forming the second benign portion; and bending the metal plate to form a first bending portion connecting the first portion and the second portion, the third portion being between the first portion and the second portion.

A first bead protruding toward the second portion may be formed in the first portion, a second bead protruding toward the first portion may be formed in the second portion, an opening may be formed adjacent the third portion, and the first bead and the second bead may face each other in the opening.

A side surface flange portion may be formed on a side of the first portion or a side of the second portion, and the step of manufacturing the cooling fin may include bending the side surface flange portion perpendicular to a surface of the first portion or a surface of the second portion.

According to embodiments of the present disclosure, a cooling fin having an air layer formed therein can be disposed between the battery cells, thereby having cooling and heat dissipation performance and at the same time blocking the propagation of fire or heat generated from any one of the battery cells to adjacent battery cells.

The effects of the present disclosure are not limited to the effects mentioned above and additional other effects not described above will be clearly understood from the description of the appended claims by those skilled in the art.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
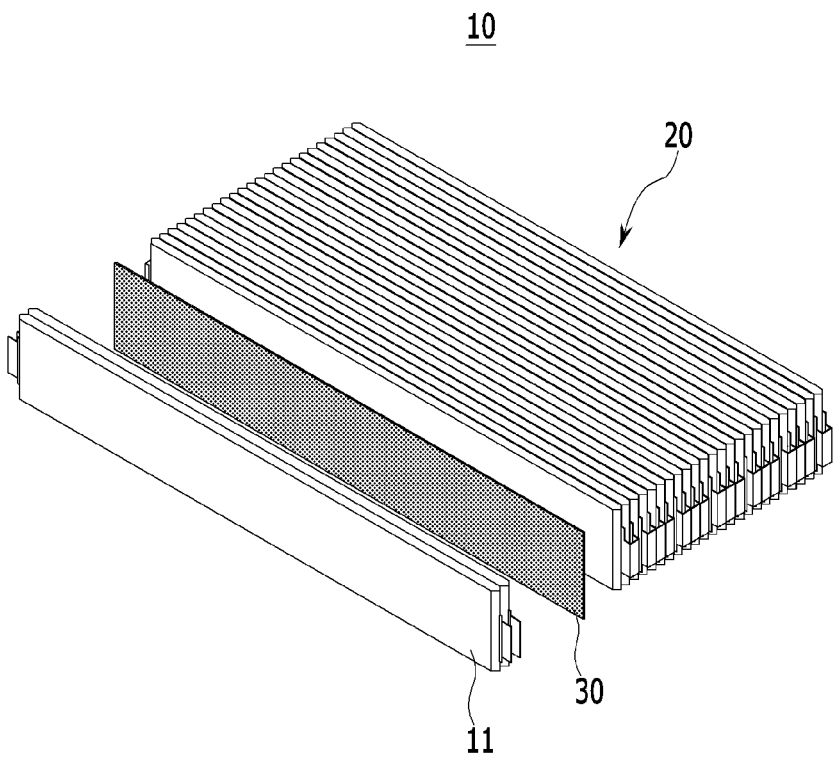
FIG. 1 is a perspective view which shows an exemplary battery module.

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means arranged on or below a reference portion, and does not necessarily mean being arranged on the upper end of the reference portion toward the opposite direction of gravity.

Further, throughout the description, when a portion is referred to as "including" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

FIG. 1 is a perspective view which shows an exemplary battery module. Referring to FIG. 1, the exemplary battery module 10 may include a battery cell stack 20 in which a plurality of battery cells 11 are stacked. The battery cell 11 may be a pouch-type battery cell. A cooling fin 30 made of a metal plate having high thermal conductivity may be disposed between the battery cells 11. The cooling fin 30 is effective for heat transfer generated in the battery cells 11, that is, heat dissipation of the battery module 10, but are insufficient to block the fire propagation generated in the battery cells 11. In other words, since the cooling fins 30 made of a metal material with high thermal conductivity are in direct contact with each of the left and right battery cells 11, it is difficult to prevent the fire or heat from propagating to adjacent battery cells 11 when a fire occurs due to heat generation of one battery cell 11.

Figure 2:
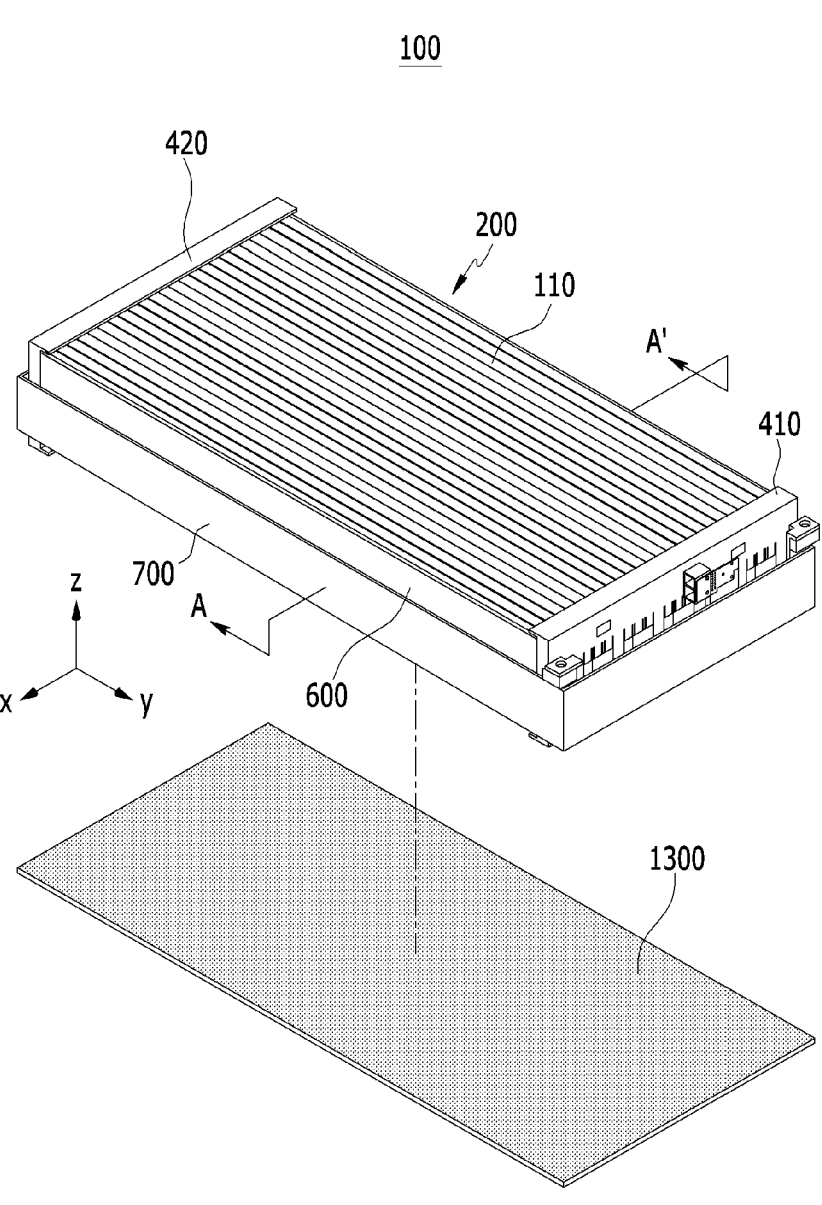
FIG. 2 is a perspective view of a battery module according to an embodiment of the present disclosure.
Figure 3:
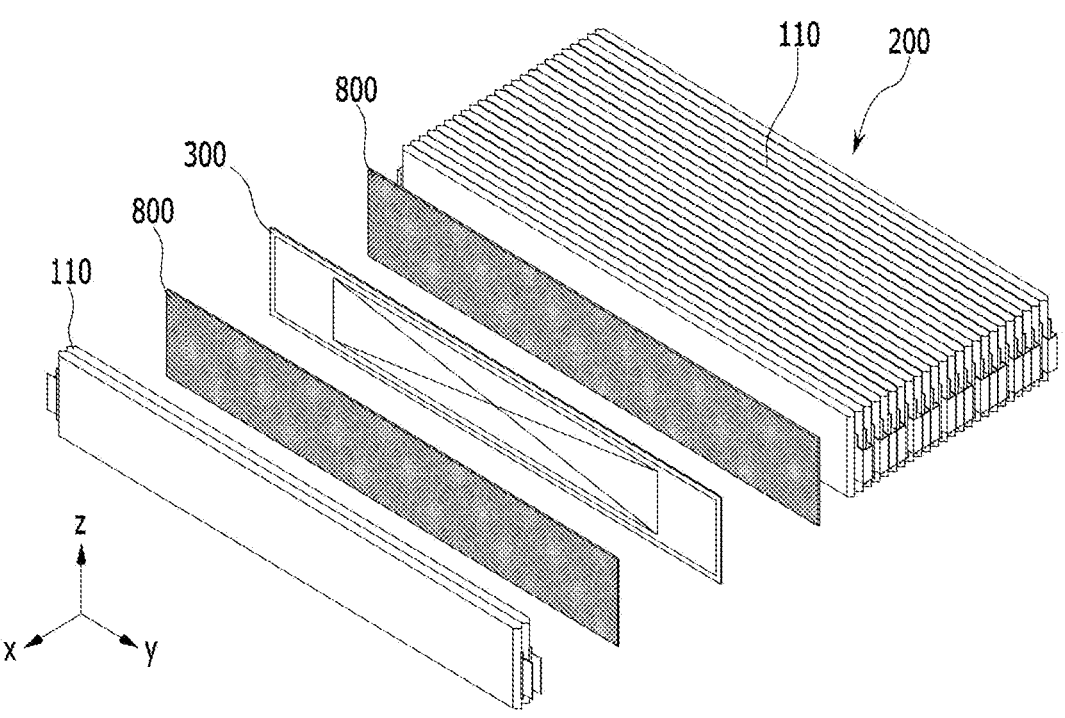
FIG. 3 is a perspective view which shows a battery cell stack and cooling fins included in the battery module of FIG. 2.
Figure 4:
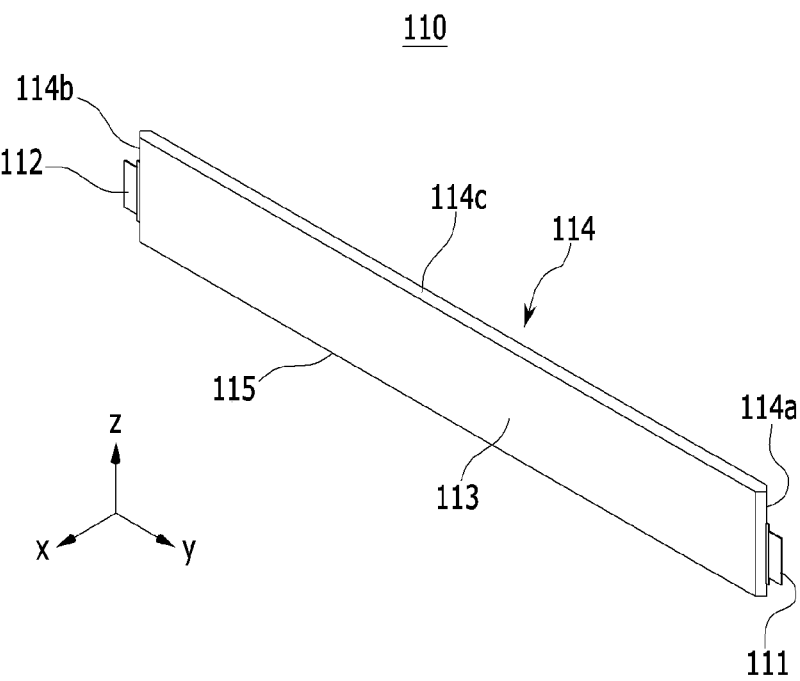
FIG. 4 is a perspective view which shows a battery cell included in the battery cell stack of FIG. 3.

FIG. 2 is a perspective view of a battery module according to an embodiment of the present disclosure. FIG. 3 is a perspective view which shows a battery cell stack and cooling fins included in the battery module of FIG. 2. FIG. 4 is a perspective view which shows a battery cell included in the battery cell stack of FIG. 3.

The battery module 100 according to an embodiment of the present disclosure includes a battery cell stack 200 in which a plurality of battery cells 110 are stacked, and cooling fins 300 located between the battery cells 110

First, the battery cells 110 are preferably a pouch-type battery cell, and can be formed in a rectangular sheet-like structure. The battery cell 110 according to the present embodiment includes first and second electrode leads 111 and 112 that are protruded. Specifically, the battery cell 110 according to the present embodiment has a structure in which the first and second electrode leads 111 and 112 face each other with respect to the cell body 113 and protrude from one end 114a and the other end 114b, respectively. More specifically, the first and second electrode leads 111 and 112 are connected to an electrode assembly (not shown), and protruded from the electrode assembly (not shown) to the outside of the battery cell 110. The first and second electrode leads 111 and 112 have mutually different polarities, and as an example, one of them may be a cathode lead 111 and the other may be an anode lead 112. That is, the cathode lead 111 and the anode lead 112 can be protruded so as to face in opposite directions with reference to one battery cell 110.

Meanwhile, the battery cell 110 can be manufactured by joining both end portions 114a and 114b of the cell case 114 and one side portion 114c connecting them in a state in which an electrode assembly (not shown) is housed in a cell case 114. In other words, the battery cells 110 according to the present embodiment have a total of three sealing portions, the sealing portion has a structure in which it is sealed by a method such as heat fusion, and the other side portion can be composed of a connection portion 115. The cell case 114 can be composed of a laminated sheet including a resin layer and a metal layer.

Such a battery cell 110 may be composed of a plurality of cells, and the plurality of battery cells 110 may be stacked together so as to be electrically connected with each other, thereby forming the battery cell stack 200. In particular, as shown in FIGS. 2 and 3, a plurality of battery cells 110 may be stacked along a direction parallel to the x-axis. Thereby, the electrode leads 111 and 112 may protrude in the y-axis direction and the -y-axis direction, respectively.

Next, the cooling fins 300 according to the present embodiment will be described in detail with reference to FIGS. 3 and 5 to 7.

Figure 5:
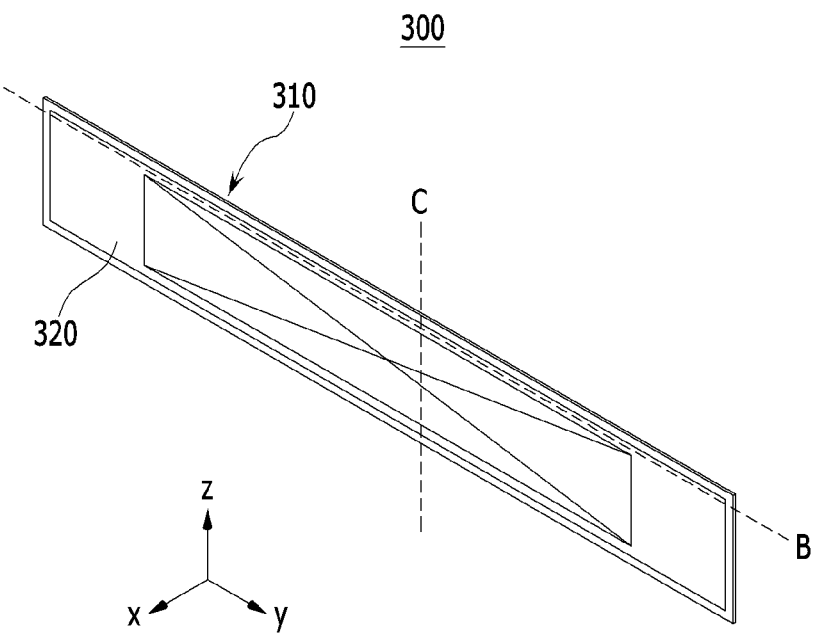
FIG. 5 is a perspective view which shows the cooling fin of FIG. 3.
Figure 6:
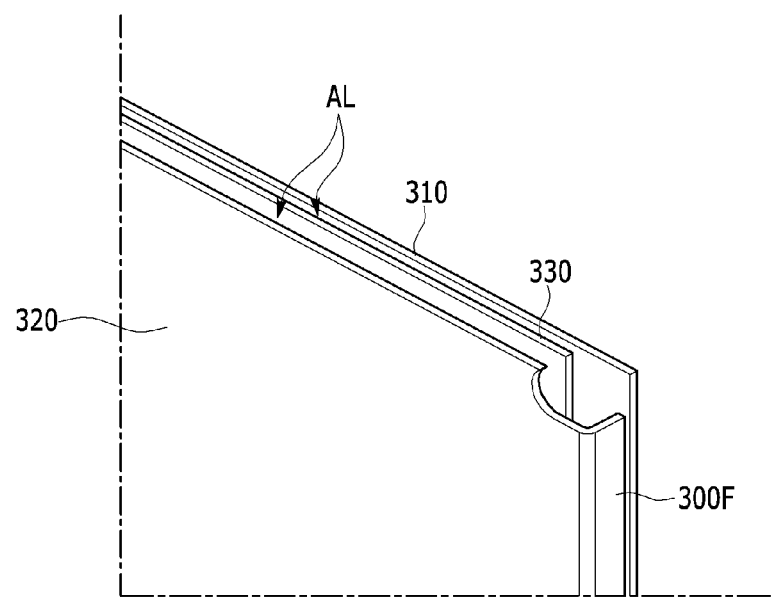
FIG. 6 is a perspective view which shows a state in which a portion corresponding to line B of the cooling fin of FIG. 5 is cut along the xy plane.
Figure 7:
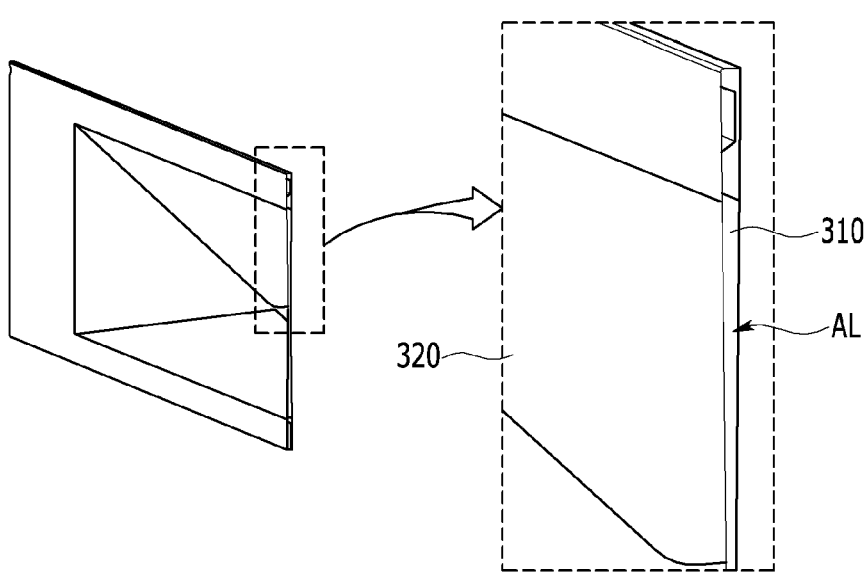
FIG. 7 is a perspective view which shows a state in which a portion corresponding to line C of the cooling fin of FIG. 5 is cut along the xz plane.

FIG. 5 is a perspective view which shows the cooling fin of FIG. 3. FIG. 6 is a perspective view which shows a state in which a portion corresponding to line B of the cooling fin of FIG. 5 is cut along the xy plane. FIG. 7 is a perspective view which shows a state in which a portion corresponding to line C of the cooling fin of FIG. 5 is cut along the xz plane.

Referring to FIGS. 3 and 5 to 7, the cooling fin 300 according to the present embodiment includes a first portion 310 facing one of the battery cells 110 and a second portion 320 facing the other of the battery cells 110. An air layer AL is formed between the first portion 310 and the second portion 320. That is, the first portion 310 and the second portion 320 are metal plates, and are spaced apart from each other, and an empty space, that is, the air layer AL, is provided between them.

If it is simply a single metal plate, like as an exemplary cooling fin 30 (see FIG. 1), there is no problem in transferring the heat generated in the battery cell 11, but it is difficult to block the fire generated in the battery cell 11 from propagating to the adjacent battery cells 11. On the other hand, the cooling fin 300 according to the present embodiment has an air layer AL formed therein, wherein such an air layer AL can function as a heat insulating layer. Even if a fire occurs due to heat generation in any one of the battery cells 110, the propagation of fire or heat to the adjacent battery cells 110 can be delayed due to the air layer AL provided between the battery cells 110. That is, it is possible to secure a time for the fire to propagate to the peripheral battery cell 110 and thus improve the safety of the battery module 100. Especially, when the battery module 100 is included in the vehicle battery pack, it is possible to delay the propagation of the fire between the battery cells 110 and thus secure a time margin for a driver to evacuate from the fire. In addition, since the first portion 310 and the second portion 320, which are metal plates, face the battery cells 110, respectively, there is no abnormality in the heat transfer in the upper direction or the lower direction of the battery module 100. In particular, since the first portion 310 or the second portion 320 of the cooling fin 300 is in direct contact with the thermal conductive resin layer 1300 described later, there is no risk of deterioration in heat transfer performance. That is, the cooling fin 300 according to the present embodiment has cooling and heat dissipation performance, and at the same time, can block the fire generated from one of the battery cells from propagating to the adjacent battery cell.

Next, the cooling fin 300 according to the embodiment of the present disclosure will be described in more detail with reference to FIGS. 8 and 9 and the like.

Figure 8:
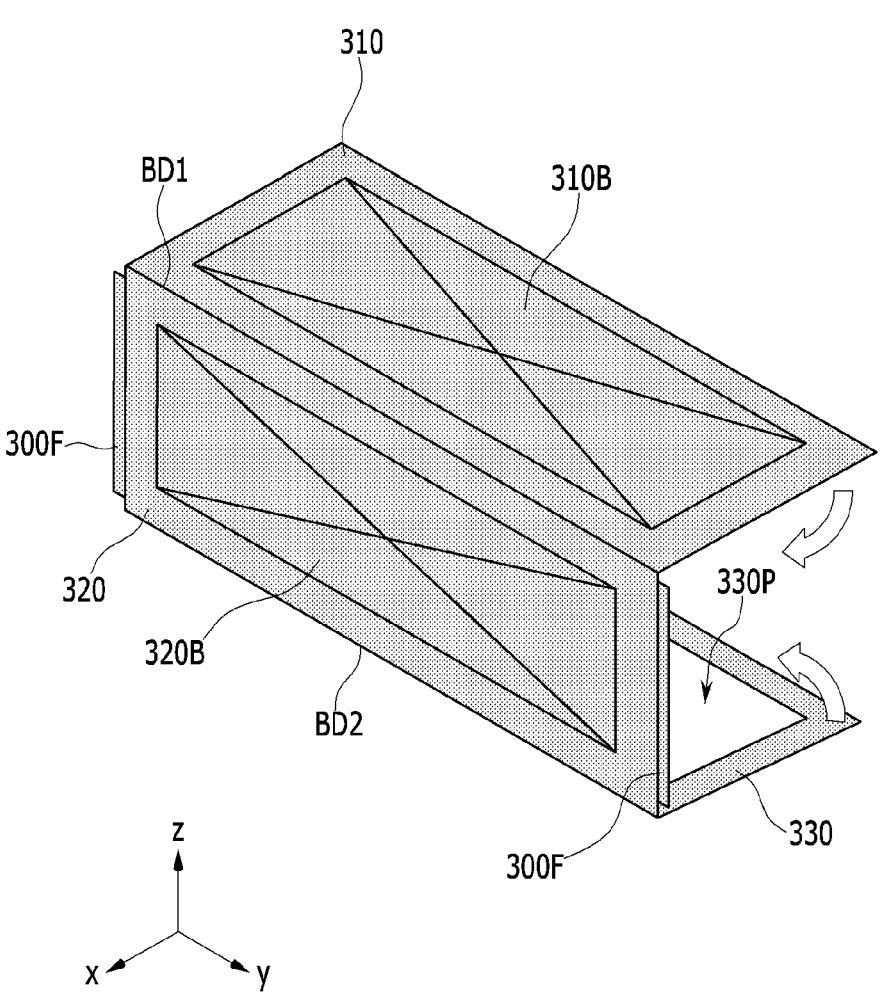
FIG. 8 is a perspective view which shows a state before the first portion, the second portion, and the third portion of the cooling fin of FIG. 5 are superimposed on each other.
Figure 9:
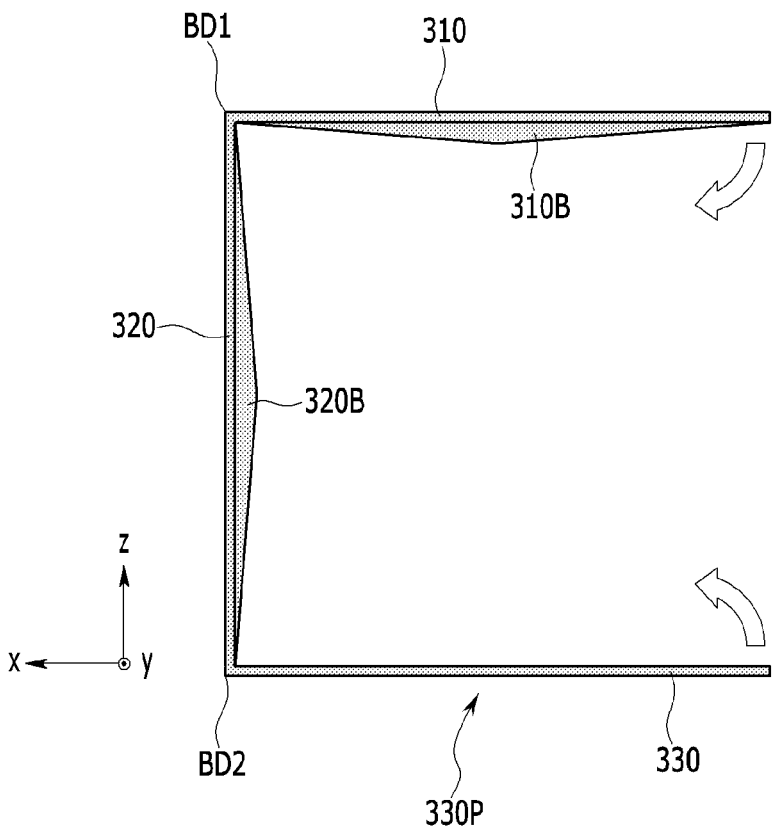
FIG. 9 is a plan view which shows the cooling fin of FIG. 8 as viewed along the -y axis on the xz plane.

FIG. 8 is a perspective view which shows a state before the first portion, the second portion, and the third portion of the cooling fin of FIG. 5 are superimposed on each other. FIG. 9 is a plan view which shows the cooling fin of FIG. 8 as viewed along the -y axis on the xz plane.

Referring to FIGS. 6 to 9, the cooling fin 300 according to an embodiment of the present disclosure may be bent at least once to form a first portion 310 and a second portion 320. In other words, the first portion 310 and the second portion 320 are formed by bending the metal plate at least once, and the first portion 310 and the second portion 320 are divided at the bent portions of one metal plate as boundaries.

More specifically, based on a superimposed state as shown in FIG. 6, the cooling fin 300 may further include a third portion 330 located between the first portion 310 and the second portion 320. A first bending portion BD1 connecting the first portion 310 and the second portion 320 is formed, a second bending portion BD2 connecting the second portion 320 and the third portion 330 is formed, and the first portion 310, the second portion 320, and the third portion 330 may be superimposed on each other. Here, the first bending portion BD1 and the second bending portion BD2 refer to bent portions of the metal plate. That is, the cooling fin 300 according to the present embodiment may have a structure in which the first portion 310, the second portion 320, and the third portion 330, which are one metal plate, are superimposed on each other and an air layer AL is formed between them. Further, the first portion 310 and the second portion are in the form of a rectangular sheet having a long side and a short side, and the first bending portion BD1 and the second bending portion BD2 may be formed on long sides of them.

On the other hand, the first bead 310B protruding in the direction of the second portion 320 may be formed in the first portion 310, and a second bead 320B protruding in the direction of the first portion 310 may be formed in the second portion 320. This is also based on a state in which the first portion 310 and the second portion 320 are superimposed on each other.

When the first portion 310 and the second portion 320 are superimposed so as to face each other, the first bead 310B and the second bead 320B may face each other. More specifically, an opening 330P penetrating the third portion 330 may be formed. When the first portion 310, the second portion 320 and the third portion 330 are superimposed on each other, the first bead 310B and the second bead 320B may face each other through the opening 330P, and the first bead 310B and the second bead 320B may contact each other. Due to the first bead 310B and the second bead 320B protruding in mutually opposite directions, the cooling fin 300 may be a rectangular sheet having a concave shape. The first bead 310B and the second bead 320B may be formed in only a portion of the first portion 310 and the second portion 320, respectively, instead of the whole, and as shown in FIG. 8, it may be formed in each central portion. In addition, the opening 330P may be formed so as to correspond to the positions of the first bead 310B and the second bead 320B.

In the process of repeatedly charging and discharging a plurality of battery cells 110, a phenomenon in which the internal electrolyte decomposes to generate gas and the battery cell 110 swells, that is, a swelling phenomenon, may occur. In particular, each battery cell 110 may cause swelling in the stacking direction of the battery cells 110 (direction parallel to the x-axis, see FIGS. 2 and 3).

If it is simply a single metal plate, like an exemplary cooling fin 30 (see FIG. 1), the pressure is applied as it is to the battery cell 11 located on the opposite side of the cooling fin 30 when any one of the adjacent battery cells 11 is swelling. When the swelling of each battery cell 11 cannot be suppressed, it may cause structural deformation of the battery module 10, and may adversely affect the durability of the battery module 10.

On the other hand, in the case of the cooling fin 300 according to the present embodiment, a bead structure of the first bead 310B and the second bead 320B is provided, so that when the adjacent battery cells 110 are swelled up, a uniform elastic force can be applied to the corresponding battery cells 110 as a reaction thereto. Further, when the battery cell 110 swells by the elastic restoring force of the third portion 330 located between the first portion 310 and the second portion 320, it is possible to reduce the pressure transferred to the battery cell 110 located on the opposite side.

On the other hand, the side surface flange portion 300F may be located on both sides of the first portion 310 or the second portion 320. Based on the state in which the first portion 310 and the second portion 320 are superimposed on each other, the side surface flange portion 300F may be bent perpendicularly to one surface of the first portion 310 or the second portion 320. In FIG. 8, the side surface flange portion 300F before being bent is illustrated, but the side surface flange portion 300F may be bent perpendicularly to one surface of the first portion 310 or the second portion 320 as shown in FIG. 6. The air layer AL provided inside the cooling fin 300 may be configured so as to be surrounded by the first portion 310, the second portion 320, and the side surface flange portion 300F. The side surface flange portion 300F covers a sharp portion of the first portion 310 or the second portion 320, thereby preventing the first portion 310 or the second portion 320 from damaging components inside the battery module 100 including the battery cell 110, and the like.

Meanwhile, referring to FIG. 3 again, in some cases, an adhesive member 800 may be provided between the battery cell 110 and the cooling fin 300. As the number of the battery cells 110 increases, the battery cells 110 and the cooling fins 300 interposed therebetween can be fixed to dispose the adhesive member 800 having adhesive strength in order to provide the structurally stable battery cell stack 200. The adhesive member 800 can be applied without particular limitation as long as it is a thin member having adhesive properties. As an example, a double-sided tape can be used as the adhesive member 800.

Meanwhile, referring to FIGS. 2 and 3 again, the battery module 100 according to the present embodiment may include an elastic member 700, first and second sensing blocks 410 and 420, and a side surface pad 600.

The elastic member 700 may include a material having elasticity, and can cover the front surface, rear surface, and both side surfaces of the battery cell stack 200. Here, the front surface means a surface of the battery cell stack 200 in the y-axis direction, the rear surface means a surface of the battery cell stack 200 in the -y-axis direction, and both side surfaces mean surfaces of the battery cell stack 200 in the x-axis and -x-axis directions, respectively. The upper portion and the lower portion of the elastic member 700 are opened, and the upper surface and the lower surface of the battery cell stack 200 can be exposed. Here, the upper surface and the lower surface mean the surfaces of the battery cell stack 200 in the z-axis and -z-axis directions, respectively.

The first sensing block 410 may be located between the front surface of the battery cell stack 200 and the elastic member 700, and the second sensing block 420 may be located between the rear surface of the battery cell stack 200 and the elastic member 700. The first sensing block 410 and the second sensing block 420 may include an electrically insulating material, for example, a plastic material, a polymer material, or a composite material. Further, the first sensing block 410 and the second sensing block 420 have a kind of basket shape, and may be configured so as to cover the front surface and the rear surface of the battery cell stack 200, respectively. The electrode leads 111 and 112 (see FIG.

4) of each battery cell 110 may pass through a slit formed in the first sensing block 410 and the second sensing block 420 and then be bent and joined to each other. Thereby, the battery cells 110 can be connected to each other in series or in parallel.

A plate-shaped side surface pad 600 is disposed between the both side surfaces of the battery cell stack 200 and the elastic member 700 to complement the rigidity of the battery module 100, and perform a buffering function between the battery cell 110 and the elastic member 700. A foam material pad can be applied to the side surface pad 600.

Next, a thermal conductive resin layer according to an embodiment of the present disclosure will be described in detail with reference to FIG. 10.

Figure 10:
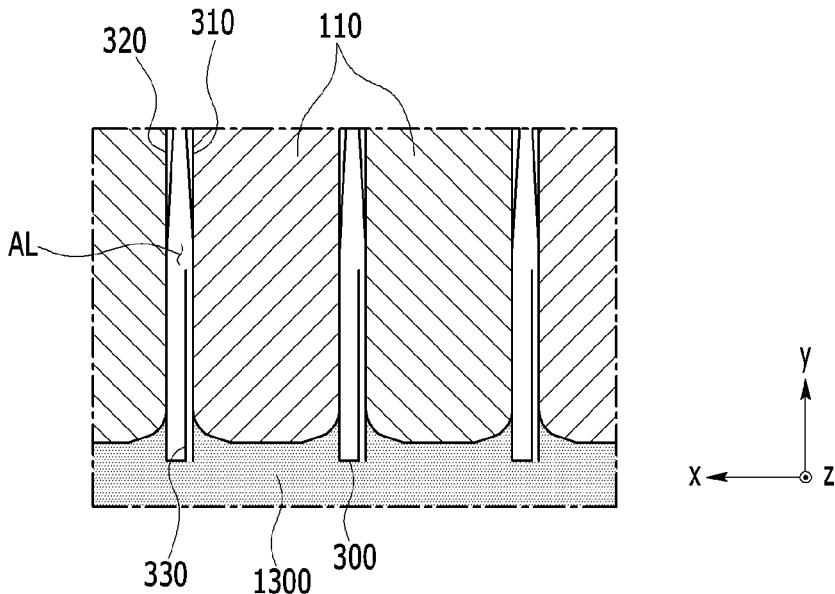
FIG. 10 is a cross-sectional view which shows a part of a cross-section taken along the cutting line A-A' of FIG. 2.

FIG. 10 is a cross-sectional view which shows a part of a cross-section taken along the cutting line A-A' of FIG. 2. At this time, FIG. 10 shows a cross-section thereof assuming that the battery cell stack 200 of FIG. 2 is in contact with the thermal conductive resin layer 1300.

The battery module 100 according to an embodiment of the present disclosure may further include a thermal conductive resin layer 1300 located under the battery cell stack 200. In one embodiment of the present disclosure, the battery module 100 of FIG. 2 may be housed in a pack frame to form a battery pack. In this case, the thermal conductive resin layer 1300 is located at the bottom portion of the pack frame, and the lower surface of the battery cell stack 200 may be seated on the thermal conductive resin layer 1300. In another embodiment of the present disclosure, although not specifically shown in the figure, a battery cell stack can be inserted into a module frame to form a battery module. In this case, the thermal conductive resin layer 1300 is located at the bottom portion of the module frame, and the lower surface of the battery cell stack 200 can be seated on the thermal conductive resin layer 1300.

The thermal conductive resin layer 1300 can be formed by applying a thermal conductive resin. The thermal conductive resin may include a thermal conductive adhesive material, and specifically, it may include at least one of a silicone material, a urethane material, and an acrylic material. The thermal conductive resin is a liquid during application but is cured after application, so that it can perform the role of fixing one battery cell 110 constituting the battery cell stack 200. Further, since the thermal conductive resin has excellent heat transfer properties, it is possible to transfer the heat generated in the battery cell 110 to the outside and thus prevent the battery module 100 from overheating.

In this case, the battery cell 110 may be in direct contact with the thermal conductive resin layer 1300. Thereby, the heat transfer path in the downward direction of the battery module 100 is simplified, and the possibility of generating an air layer such as an air gap can be reduced. Therefore, the cooling performance of the battery module 100 or a battery pack including the same can be improved.

Further, the cooling fin 300 can extend from the lower surface of the battery cell stack 200, whereby the cooling fin 300 can also be come into direct contact with the thermal conductive resin layer 1300. The cooling fin 300 facing the battery cells 110 is configured so as to be in direct contact with the thermal conductive resin layer 1300, thereby capable of maximizing heat dissipation performance.

Next, a method for manufacturing a battery module according to an embodiment of the present disclosure will be described in detail with reference to FIGS. 2, 3, 8 and 11 to 14. However, portions overlapping with the contents described above will be omitted to avoid repetition and redundancy.

First, referring to FIGS. 2 and 3, the manufacturing method of the battery module 100 according to an embodiment of the present disclosure includes the steps of: manufacturing a cooling fin 300 from a metal plate; and stacking a plurality of battery cells 110 and interposing the cooling fin 300 between battery cells 110 adjacent to each other among the battery cells 110 to manufacture a battery cell stack 200. The battery cell stack 200 can be manufactured by sequentially stacking the plurality of battery cells 110 and the cooling fins 300 disposed between them.

At this time, the cooling fin 300 includes a first portion 310 in contact with one of the adjacent battery cells 110 and a second portion 320 in contact with the other of the adjacent battery cells 110, wherein an air layer AL is formed between the first portion 310 and the second portion 320. Further, a first bead 310B protruding in the direction of the second portion 320 may be formed on the first portion 310, and a second bead 320B protruding in the direction of the first portion 310 may be formed on the second portion 320. Further, the cooling fin 300 may further include a third portion 330 located between the first portion 310 and the second portion 320 based on a superimposed state. Since the above contents overlap with the portions described above, further description thereof will be omitted.

As described above, the cooling fin 300 according to the present embodiment has a structure in which the first portion 310, the second portion 320, and the third portion 330, which are one metal plate, form an air layer AL while being superimposed on each other. Next, a step of manufacturing the cooling fin 300 will be described in detail with reference to FIGS. 11 to 14.

FIGS. 11 to 14 are diagrams which explain a step of manufacturing a cooling fin in a method for manufacturing a battery module according to an embodiment of the present disclosure. At this time, the figures (b) in FIGS. 11 to 14 are the states of the figures (a) as viewed from the side.

Figure 11:
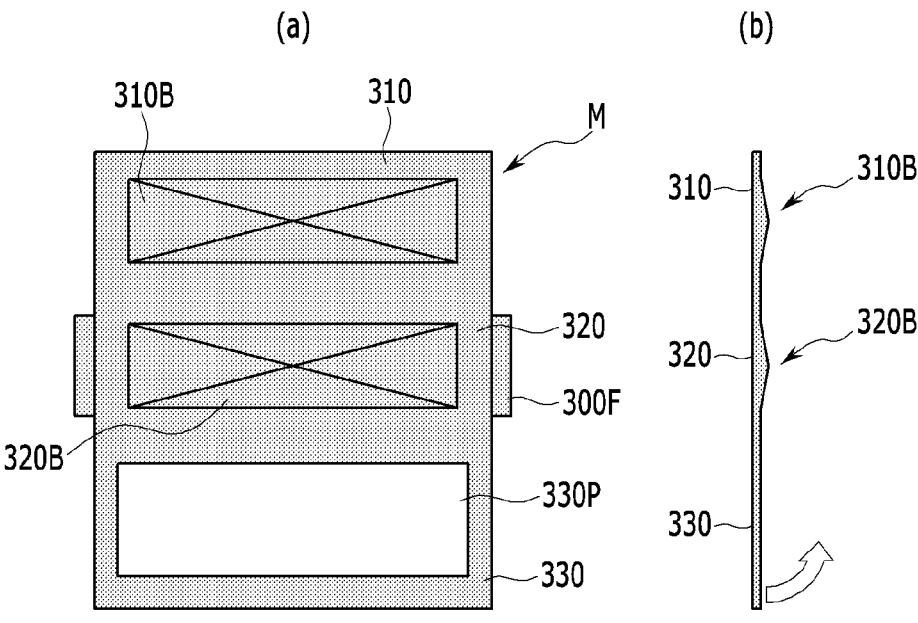
FIGS. 11 to 14 are diagrams which explain a step of manufacturing a cooling fin in a method for manufacturing a battery module according to an embodiment of the present disclosure.
Figures 12, 13:
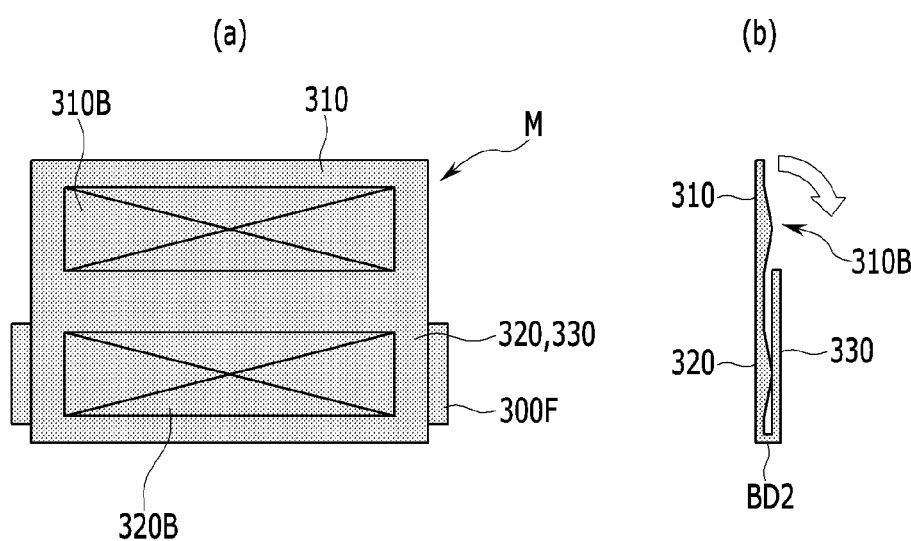

First, referring to FIGS. 11 and 12, the step of manufacturing the cooling fin 300 may include a step of forming a second bending portion BD2 connecting the second portion 320 and the third portion 330 to bend the metal plate M so that the second portion 320 and the third portion 330 are superimposed on each other.

Next, referring to FIGS. 12 and 13, the step of manufacturing the cooling fin 300 may include a step of forming a first bending portion BD1 connecting the first portion 310 and the second portion 320, and bending the metal plate M so that the first portion 310, the second portion 320, and the third portion 330 are superimposed on each other.

In this case, forming the second bending portion BD2 or the first bending portion BD1 means bending the metal plate M. Further, an opening 330P penetrating the third portion 330 may be formed, and the first bead 310B and the second bead 320B may face each other through the opening 330P.

Figure 14:
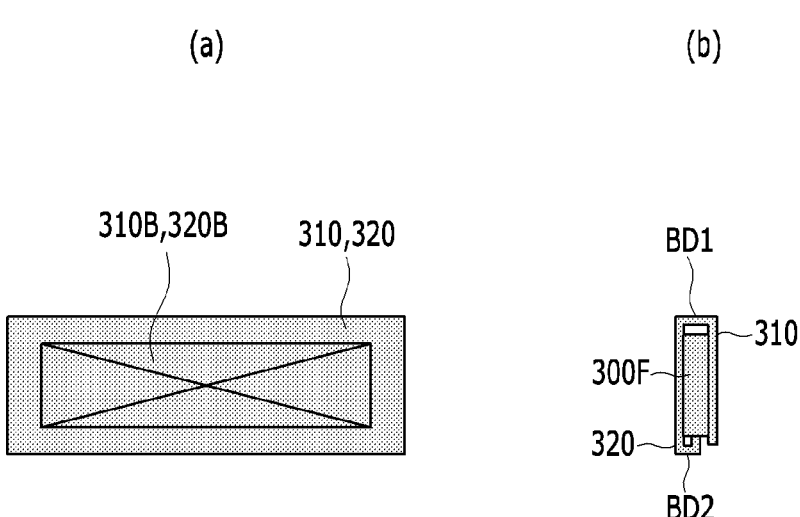

Next, referring to FIGS. 13 and 14, side surface flange portions 300F may be formed on both sides of the first portion 310 or the second portion 320. In FIG. 11, FIG. 12 or the like, it is shown that the side surface flange portion 300F is formed in the second portion, but it may be formed in the first portion 310. The side on which the side surface flange part 300F is formed is preferably a side on which the first bending portion BD1 or the second bending portion BD2 is not formed.

The step of manufacturing the cooling fin 300 may include a step of bending the side surface flange portion 300F so that the side surface flange portion 300F is perpendicular to one surface of the first portion 310 or the second portion 320. Therefore, the cooling fin 300 configured such that the air layer AL is surrounded by the first portion 310, the second portion 320, and the side surface flange portion 300F can be manufactured.

Although the terms representing directions such as front, rear, left, right, upper and lower directions are used herein, these merely represent for convenience of explanation, and may differ depending on a position of an object, a position of an observer, or the like.

The above-mentioned one or more battery modules according to an embodiment of the present disclosure may be mounted together with various control and protection systems such as BMS (battery management system) and a cooling system to form a battery pack.

The battery module or the battery pack can be applied to various devices. Such a device can be applied to a vehicle means such as an electric bicycle, an electric vehicle, or a hybrid vehicle, but the present disclosure is not limited thereto, and is applicable to various devices that can use a secondary battery.

Although preferred embodiments of the present disclosure have been described in detail above, the scope of the present disclosure is not limited thereto, and various modifications and improvements made by those skilled in the art using the basic concepts of the present disclosure, which are defined in the appended claims, also falls within the scope of the present disclosure.

DESCRIPTION OF REFERENCE NUMERAL

100: battery module
200: battery cell stack
300: cooling fin
310: first portion
320: second portion

The invention claimed is:

1. A battery module comprising:
a battery cell stack comprising a plurality of battery cells; and
a cooling fin between the plurality of battery cells,
wherein the cooling fin comprises a first portion facing a first one of the plurality of battery cells and a second portion facing a second one of the plurality of battery cells, and
wherein a space is formed between the first portion and the second portion,
wherein the cooling fin further comprises a third portion,
wherein the cooling fin is bent to form a first bending portion connecting the first portion and the second portion,
wherein the cooling fin is bent to form a second bending portion connecting the second portion and the third portion, and
wherein the third portion is between the first portion and the second portion.

2. The battery module according to claim 1, wherein:
a first bead protruding toward the second portion is formed in the first portion, and
wherein a second bead protruding toward the first portion is formed in the second portion.

3. The battery module according to claim 1, wherein the cooling fin is bent at least once to form the first portion and the second portion.

4. The battery module according to claim 1, wherein a first bead protruding toward the second portion is formed in the first portion,
wherein a second bead protruding toward the first portion is formed in the second portion, wherein an opening is formed adjacent the third portion, and
wherein the first bead and the second bead face each other in the opening.

5. The battery module according to claim 4, wherein a side surface flange portion is on a side of the first portion or a side of the second portion, and
wherein the side surface flange portion is bent perpendicular to a surface of the first portion or a surface of the second portion.

6. The battery module according to claim 4, wherein:
a rectangular sheet having a first side and a second side include the first portion and the second portion,
wherein the first bending portion and the second bending portion are formed on the first side, and
wherein the first side is longer than the second side.

7. The battery module according to claim 1,
further comprising a thermal conductive resin layer under the battery cell stack,
wherein the plurality of battery cells and the cooling fin are in contact with the thermal conductive resin layer.

8. A method for manufacturing a battery module, the method comprising the steps of:
forming a cooling fin from a metal plate; and
stacking a plurality of battery cells with the cooling fin between adjacent battery cells of the plurality of battery cells to form a battery cell stack,
wherein the cooling fin comprises a first portion in contact with a first one of the adjacent battery cells and a second portion in contact with a second one of the adjacent battery cells, and
wherein a space is formed between the first portion and the second portion,
wherein the cooling fin further comprises a third portion between the first portion and the second portion,
wherein the step of manufacturing the cooling fin comprises:
bending the metal plate to form a second bending portion connecting the second portion and the third portion, the second portion and the third portion facing each other by forming the second bending portion; and
bending the metal plate to form a first bending portion connecting the first portion and the second portion,
wherein the third portion is between the first portion and the second portion.

9. The method for manufacturing a battery module according to claim 8, wherein:
a first bead protruding toward the second portion is formed in the first portion, and
wherein a second bead protruding toward the first portion is formed in the second portion.

10. The method for manufacturing a battery module according to claim 8, wherein;
a first bead protruding toward the second portion is formed in the first portion,
wherein a second bead protruding toward the first portion is formed in the second portion,
wherein an opening is formed adjacent the third portion, and
wherein the first bead and the second bead face each other in the opening.

11. The method for manufacturing a battery module according to claim 8, wherein:
a side surface flange portion is formed on a side of the first portion or a side of the second portion, and wherein the step of manufacturing the cooling fin further comprises bending the side surface flange portion perpendicular to a surface of the first portion or a surface of the second portion.

* * * * *